US Patent Number: 4,788,421
Date of Patent: Nov. 29, 1988

Ogawa et al.

[54] APPARATUS FOR CONTROLLING RELATIVE MOVEMENT OF AN OPTICAL HEAD TO AN OPTICAL DISK WITH VELOCITY DETECTION

[75] Inventors: Masaharu Ogawa; Keiji Nakatsu, both of Amagasaki, Japan

[73] Assignee: Mitsubishi Denki Kabushiki Kaisha, Tokyo, Japan

[21] Appl. No.: 863,026

[22] Filed: May 14, 1986

[30] Foreign Application Priority Data

May 15, 1985 [JP] Japan .................. 60-101439
May 15, 1985 [JP] Japan .................. 60-101440

[51] Int. Cl.⁴ .................................. G01J 1/20
[52] U.S. Cl. ........................ 250/201; 369/44
[58] Field of Search ........... 250/201 DF, 202; 369/44, 46, 41, 33

[56] References Cited

U.S. PATENT DOCUMENTS 4,513,406  4/1985  Ishihara ................. 369/44
4,545,003  10/1985 Hirano et al. .......... 369/44
4,607,358  8/1986  Maeda et al. .......... 369/44
4,615,023  9/1986  Inada et al. ........... 250/202
4,677,602  6/1987  Okano et al. .......... 369/41

OTHER PUBLICATIONS

"Optical video recorder using tellurium sub-oxide thin film disk", Tomio Yoshida et al., SPIE vol. 329 Optical Disk Technology (1982, pp. 40-45).

"Optical disk memory system", Teruo Murakami et al., SPIE vol. 329 Optical Disk Technology (1982), pp. 25-32).

Primary Examiner—David C. Nelms
Assistant Examiner—Michael Messinger
Attorney, Agent, or Firm—Lowe, Price, LeBlanc, Becker & Shur

[57] ABSTRACT

A control apparatus comprises a linear actuator (49) which moves an optical head (37) having a photo detector (45) in a radial direction of an optical disk (33), a velocity detection circuit (57) which detects relative moving velocity of the optical head (37) to the optical disk (33) during track accessing, and a linear actuator drive control circuit (50) which controls the actuator (49) in response to the detected velocity. The velocity detection circuit (57) generates a digital signal which corresponds to a cycle of an RF output signal of the photo detector (45) and, in response to this digital signal, it further generates an analog signal, which corresponds to the inverse of the cycle of the RF signal, to be outputted as the relative moving velocity of the optical head (37).

14 Claims, 11 Drawing Sheets (a)

(b)

(c)

(a)

(b)

(c)

APPARATUS FOR CONTROLLING RELATIVE MOVEMENT OF AN OPTICAL HEAD TO AN OPTICAL DISK WITH VELOCITY DETECTION

BACKGROUND OF THE INVENTION

1. Field of the Invention

The present invention relates to a movement control apparatus for an optical head, and particularly to a control apparatus capable of controlling moving velocity of the optical head during track accessing by detecting relative moving velocity of the optical head to an optical disk.

2. Description of the Prior Art

Conventionally, in an optical disk apparatus, an optical head including an object lens or the like moves in the radial direction of an optical disk, and the capability of highly accurate positioning of the optical head is required especially during track accessing. A technology for such positioning of the optical head is disclosed in, e.g., Tomio Yoshida, Takeo Ohta and Shunji Ohara, SPIE Vol. 329 Optical Disk Technology (1982), pp. 40-45 "Optical Video Recoder Using Tellurium Sub-Oxide Thin Film Disk" and in Teruo Murakami, Isao Hoshino and Masafumi Mori, SPIE Vol. 329 Optical Disk Technology (1982), pp. 25-32 "Optical Disk Memory System".

In order to control the movement of the optical head while accessing tracks of an optical disk, detection of the moving velocity of the optical disk itself is commonly needed. Is is known that a velocity detecting system which is conventionally used for a magnetic disk apparatus can be adapted to an optical disk apparatus for detecting such moving velocity.

FIG. 1 is a schematic block diagram showing a magnetic head control system of the above described conventional magnetic disk storage at the time of track accessing; and FIG. 2 is a schematic diagram of a velocity detection circuit included in the control system of FIG. 1. The circuit shown in FIGS. 1 and 2 is disclosed in e.g. Servo Technology Manual Vol. 2 (issued by New Technology Developing Center) which was published in Japan.

The structure of the magnetic head control system of the conventional magnetic disk storage will be described with reference to FIGS. 1 and 2. Referring to FIG. 1, a servo signal reproduced from a magnetic disk (not shown) by a magnetic head 1 is applied to a position detection circuit 2. Responding to this signal, this position detection circuit 2 generates a voltage which is in proportion to the displacement of the magnetic head 1 to be applied to a velocity detection circuit 3. On the other hand, the velocity of the magnetic head 1 is controlled by a voice coil 7, and a current which flows through this voice coil 7, i.e., a current obtained from a power amplifier 6 is also applied to the velocity detection circuit 3. The velocity detection circuit 3 generates, as will be described later, a velocity detection signal which represents moving velocity of the magnetic head 1 on the basis of outputs from the position detection circuit 2 and the power amplifier 6, and applies it to a velocity curve generation circuit 4. The velocity curve generation circuit 4 converts the applied velocity detection signal into an aimed velocity voltage and applies to a servo logic circuit 5. The servo logic circuit 5 generates an operation signal of the voice coil 7 in response to the output of the velocity curve generation circuit 4. This operation signal is amplified by the power amplifier 6 and then applied to the voice coil 7.

FIG. 2 shows the velocity detection circuit 3 of FIG. 1 in detail, in which the output of the position detection circuit 2 is applied to a terminal 8, and the output of the power amplifier 6 is applied to a terminal 9. A capacitor 10, resistors 11 and 12, and an operational amplifier 13 form a differentiating operational circuit 14, which generates a velocity signal by differentiating the output of the position detection circuit 2. The velocity signal output of the differentiating operational circuit 14 is applied to the input of a non-inverting operational circuit 15 and the input of an inverting operational circuit 16; the output of the non-inverting operational circuit 15 is selected by a switch 17 to be applied to a resistor 19; the output of the inverting operational circuit 16 is selected by a switch 18 to be applied to the resistor 19. On the other hand, the output of the power amplifier 6 applied to the terminal 9, i.e. the current which flows through the voice coil 7, is applied to one input of an operational amplifier 21 through a resistor 20. When a switch 22 is on, the operational amplifier 21 together with resistors 19 and 23 and a capacitor 24, form a low pass filter. When the switch 22 is off, the operational amplifier together with the resistor 19 and the capacitor 24 form an integrator. In addition, an offset adjusting resistor 25 is connected between the other input of the operational amplifier 21 and the ground potential. The output of the operational amplifier 21 is applied to an output terminal 26.

FIG. 3 is a diagram of waveforms for describing the operation of the circuit shown in FIGS. 1 and 2. First, the operation of the magnetic head control system of the conventional magnetic disk storage shown in FIG. 1 will be described with reference to FIG. 3. In the control system of FIG. 1, during track accessing, a servo signal detected by the magnetic head 1 is applied to the position detection circuit 2, which in turn generates a position signal S20 (FIG. 3) which is a voltage signal corresponding to the displacement of the magnetic head 1. The position signals 20 and the signal detected from the power amplifier 6 as a current flowing through the voice coil 7 are applied to the velocity detection circuit 3, and this velocity detection circuit 3 generates a voltage signal S28 (FIG. 3) which corresponds to the velocity, according to a method which will be described later. The signal S28 is converted into a velocity voltage aimed at moving the magnetic head 1 by means of the velocity curve generation circuit 4. The aimed velocity voltage is supplied to the power amplifier 6 through the servo logic circuit 5. A current for accelerating or decelerating the magnetic head 1 is applied to the voice coil 7 from the power amplifier 6, thereby controlling the moving velocity of the magnetic head 1 and enabling access to the aimed track.

The operation of the velocity detection circuit shown in FIG. 2 will be described with reference to FIG. 3. The position signal S20 is applied to the input terminal 8 of the velocity detection circuit 3 from the position detection circuit 2; a current signal S23 (FIG. 3) of the voice coil 7 is applied to the input terminal 9. Now, let us assume that a mode switching signal S22 (FIG. 3), which reaches a "H" level at the linear portion of the position signal S20 and reaches a "L" level at the non-linear portion of the signal S20, is applied to the switch 22. At the linear portion of the position signal S20, the mode switching signal S22 reaches the "H" level to turn the switch 22 ON, whereby the resistors 19 and 23, the capacitor 24 and the operational amplifier 21 form the low pass filter. The position signal S20 applied to the input terminal 8 is differentiated by the differentiating operational circuit 14, and outputted as the velocity signal S21. The velocity signal 21 is applied to the non-inverting operational circuit 15 and the inverting operational circuit 16. On this occasion, a signal S26 (FIG. 3), which reaches the "H" level when the polarity of the velocity signal S21 is positive, is applied to the switch 17, while a signal S27 (FIG. 3), which reaches the "H" level when the polarity of the signal S21 is negative, is applied to the switch 18. When the polarity of the signal S21 is positive, the switch 17 turns ON; when the polarity of the signal S21 is negative, the switch 18 turns OFF; and a signal S25 (FIG. 3) is applied to the resistor 19. On the other hand, at the non-linear portion of the position signal S20, the mode switching signal S22 reaches the "L" level to turn the switch 22 OFF, whereby the resistor 19, the capacitor 24 and the operational amplifier 21 form an integrator. The current signal S23 of the voice coil 7 which is applied to the input terminal 9, is applied to this integration circuit. Since the current flowing through the voice coil 7 corresponds to the carriage acceleration of the magnetic head 1, a velocity signal S24 (FIG. 3) can be obtained by the integration of this current. Accordingly, a velocity detection signal S28 of the magnetic head 1 is outputted from the output terminal 26.

Thus, a conventional magnetic disk storage is structured such that during track accessing, it detects the velocity signal by integrating current input which corresponds to the carriage acceleration of the magnetic head at the non-linear portion of the position signal, and that it detects the velocity signal by differentiating the position signal, then removing noise by the low pass filter, and absorbing the error in integration, at the linear portion of the position signal.

Now, it is known that track accessing can also be implemented in an optical disk apparatus by the above described control system of the magnetic disk storage. In this case, instead of the velocity control of the carriage of the magnetic head, the velocity control of a linear actuator for driving an optical head, which comprises an object lens, a tracking actuator for driving said object lens, and a photo detector, is required.

FIG. 4 is a schematic diagram showing a photo detector included in the above described optical head and the signal circuit thereof, which is disclosed in, e.g. Japanese Patent Laying-Open Gazette No. 134704/1977. In FIG. 4, an incident light spot through a tracking actuator (not shown) is received at a two-split photo detector 27; a subtraction amplifying circuit 28 outputs a difference signal (hereinafter referred to as a tracking error signal) of each of the outputs of the two-split photo detector 27; an addition amplifying circuit 29 outputs a sum signal (hereinafter referred to as an RF signal) of each of the outputs of the two-split photo detector 27.

FIGS. 5A and 5B show a cross section of an optical disk (a), a waveform of the tracking error signal (b) at the formation of a light spot thereon, and a waveform of the RF signal (c) on the same occasion. More particularly, referring to FIGS. 5A(a) and 5B(a), there are a number of guiding grooves 31 on the optical disk 30 forming concentric circles or a spiral and, in addition, a pit 32 is formed in a part of the guiding grooves 31, the depth of the pit 32 being deeper than that of the guiding groove 31.

In order to control the velocity of the optical head during track accessing of such optical disk, the difference signal of the two-split photo detector 27, i.e. a tracking error signal S29 (FIGS. 5A(b) and 5B(b)) of the push-pull type outputted from the subtraction amplifier circuit 28 is used as the position signal of the optical head. Namely, the tracking error signal S29 (the position signal of the optical head) and a current signal (the acceleration signal of the optical head) of a linear actuator (not shown) are applied to the circuit which corresponds to the velocity detection circuit 3 of FIG. 1, and the moving velocity of the optical head is detected by the differentiation of the tracking error signal and by the integration of the current signal of the linear actuator. On the basis of the velocity signal detected in the above described manner, a coil current of the linear actuator is controlled by the operation of various circuits corresponding to the velocity curve generation circuit 4, servo logic circuit 5 and the power amplifier 6 in FIG. 1, whereby the velocity control of the linear actuator is accomplished.

However, in case of track accessing according to the above described manner, the tracking error signal S29 becomes almost 0 at the pit 32 in which data is stored as shown in FIG. 5B. Accordingly, the differentiation of the velocity detection circuit brings about a velocity detection signal of 0, so that a normal velocity signal cannot be detected. Namely, the conventional control system includes a problem that the velocity control of the linear actuator of the optical disk apparatus cannot be carried out smoothly.

Another control system of the optical head during track accessing for a conventional optical disk apparatus is disclosed at the National Conference 1210 of the Institute of Electronics and Communication Engineers of Japan, 1983, entitled "Track Access System for an Optical Disk". FIG. 6 is a block diagram of such control system. The structure of the control system of FIG. 6 will be hereinafter described.

Referring to FIG. 6, a number of track grooves are formed on the surface of an optical disk 33 forming concentric circles or a spiral, and memory tracks comprised of high density pit lines are formed in the track grooves. The optical disk 33 is attached to a spindle 34 and revolved by a disk motor 35. The revolution of the disk motor 35 is controlled by a disk motor drive control circuit 36. A light spot is formed on the surface of the optical disk 33 by an optical head 37, which moves in the radial direction of the optical disk 33. Light radiated from a light source 38 such as a semiconductor laser passes through a collimator lens 39, a polarizing beam splitter 40, a λ/4 plate 41, an optical path changing mirror 42 and an object lens 43 to be focused on the surface of the optical disk 33 to form a light spot. In order to position the light spot precisely on the memory track of the optical disk 33, the object lens 43 is moved slightly in the radial direction of the optical disk 33 by a tracking actuator 44. The reflected light from the optical disk 33 is detected by a two-split or four-split photo detector 45. The above described light source 38, collimator lens 39, polarizing beam splitter 40, λ/4 plate 41, optical path changing mirror 42, object lens 43, tacking actuator 44 and photo detector 45 are put in a frame 46 forming the optical head 37. The output of the two-split or four-split photo detector 45 is applied to a known addition-subtraction amplifying circuit 47. The addition subtraction amplifying circuit 47 adds the outputs of the photo detector 45 to output a sum signal (RF signal) as an information signal, while it subtracts the outputs of the photo detector 45 to output a difference signal as a tracking error signal. The tracking error signal is generated according to a well known push-pull system. However, it may be other systems such as DPD system or the like. The tracking actuator drive control circuit 48 drives the tracking actuator 44 in response to the tracking error signal from the addition-subtraction amplifying circuit 47. In addition, the optical head 37 itself is moved in the radial direction of the optical disk 33 by the linear actuator 49. The linear actuator 49 is drive controlled by a linear actuator drive control circuit 50. A track traversing detection circuit 51 detects the number of tracks which the optical head 37 traversed in response to the output of the addition-subtraction amplifying circuit 47. A velocity detector 52 detects the absolute velocity of the optical head 37. An acceleration detector 53 detects the acceleration on the basis of the velocity detection signal from the velocity detector 52. An internal signal of the tracking actuator, drive control circuit 48, an internal signal of the linear actuator drive control circuit 50, and a revolution phase pulse of the optical disk 33 which is sent from the disk motor drive control circuit 36 are applied to a waveform memory circuit 54. A micro-CPU interface 55 is provided as an interface for a micro-processor.

The operation of the control system shown in FIG. 6 will be hereinafter described. First, the disk motor 35 is activated by the disk motor drive control circuit 36 and the optical disk 33 begins to rotate. After the steady number of revolution is attained, the optical head 37 forms a light spot on the optical disk 33 in a well known manner, and it receives the reflected light at the photo detector 45. Then, the tracking actuator drive control circuit 48 operates according to the tracking error signal detected by the addition subtraction amplifying circuit 47 to drive the tracking actuator 44, and the object lens 43 is moved so that the light beam spot follows the center of the track on the optical disk 33. On this occasion, the tracking actuator drive signal from the tracking actuator drive control circuit 48 is also applied to the linear actuator drive control circuit 50. The linear actuator drive control circuit 50 drives the linear actuator 49 at low frequency to move the optical head 37 in the radial direction of the optical disk 33 thereby reducing the movement of the tracking actuator 44.

During the track accessing, the number of tracks on the optical disk 33 which the light spot traversed is counted by the track traversing detection circuit 51 and, in addition, the moving velocity of the optical head 37 which is detected by the velocity detector 52 is applied to the linear actuator drive control circuit 50, whereby the velocity is controlled such that the moving velocity of the light spot approaches 0 as the light spot approaches the target.

In addition, during the movement of the optical head 37, the acceleration of the optical head is detected by the acceleration detection circuit 53 on the basis of the moving velocity of the optical head 37 which is detected by the velocity detection circuit 52. The acceleration signal is applied to the tracking actuator 44 through the tracking actuator drive control circuit 48. In response to this signal, the tracking actuator 44 equivalently compensates the inertia force of the object lens 43 which is gathered on the tracking actuator 44 during the acceleration or deceleration of the optical head 37, thereby preventing the vibration of the tracking actuator 44.

At the tracking mode, where the light spot is following the center of the track on the optical disk 33, the internal signals of the tracking actuator drive control circuit 48 and the linear actuator drive control circuit 50 are synchronized with the revolution phase pulse of the optical disk 33 from the disk motor drive control circuit 36 to be stored in the waveform memory circuit 54. During track accessing, the stored signal is applied to the tracking actuator 44 and the linear actuator 49 through respective drive control circuits 48 and 49, thereby reducing the relative eccentricity between the light spot formed by the optical head 37 and the optical disk 33.

In such a control system, the absolute velocity of the optical head 37 detected by the velocity detection circuit 52 is controlled. Accordingly, even if the moving velocity of the optical head 37 at the time when the light spot enters the track aimed at is controlled to be 0, the relative velocity of the light spot to the track on the optical disk 33 does not become 0 due to the eccentricity of the optical disk 33 or to the vibration of the tracking actuator 44, causing difficulty in counting the number of traversed tracks, or deterioration of the drawing operation of the tracking control system at the aimed track. Consequently, the waveform memory circuit 54 for compensating eccentric component, the micro-CPU interface 55 for controlling this circuit, or the acceleration detection circuit 53 for preventing vibration of the tracking actuator 44, must be provided, causing a problem that the structure of the control system becomes complicated.

In addition, since the non-cyclic velocity of the track vibration or the disturbance velocity which is unexpectedly added to the optical disk 33 cannot be detected by the velocity detection circuit 52, these factors cannot be controlled by the linear actuator drive control circuit 50 during track accessing, resulting in another problem that the drawing operation of the tracking control system at the track aimed at becomes unsuccessful.

SUMMARY OF THE INVENTION

Briefly stated, the present invention comprises a control apparatus for controlling relative velocity of the optical head to the optical disk, including an actuator for moving the optical head in the radial direction of the optical head, a velocity detection means for detecting relative moving velocity of the optical head to the optical disk during accessing to the tracks of the optical disk, and an actuator control means for controlling the actuator in response to the detected velocity. The velocity detection means comprises a first means for generating a first signal which corresponds to the cycle of a photoelectric conversion signal generated by the photo detector of the optical head, and a second means for outputting a second signal, which is in the inverse relation of the cycle of the photoelectric conversion signal, as the relative moving velocity in response to the first signal.

According to another aspect of the present invention, the first means comprises a comparator for converting the photoelectric converting signal into a rectangular pulse signal, a reference clock pulse generation circuit for generating a reference clock pulse, a gate circuit for receiving said rectangular pulse signal and the reference clock pulse to output the reference clock pulse, the gate being opened corresponding to the rectangular pulse signal, and a counter circuit for counting pulses outputted from the gate circuit and for outputting the count value as a first signal; the second means comprises a memory circuit for generating a digital signal representing a value which is in the inverse relation to the count value counted by the counter circuit, and a digital/analog converter for converting the digital signal outputted from the memory circuit into an analog signal and for outputting said analog signal as a second signal.

According to yet another aspect of the present invention, the first means further comprises a dividing circuit for dividing the reference clock pulse outputted from the reference clock pulse generation circuit by N, and a first switch for selectively outputting the output pulse of the reference clock pulse generation circuit or the output pulse of the dividing circuit; the gate circuit being opened corresponding to the rectangular pulse signal, outputs the pulse selected by the first switch; the second means further comprises an amplifier for amplifying the output of the digital/analog converter by 1/N, and a second switch for selectively outputting the output of the digital/analog converter or the output of the amplifier as a second signal; the control apparatus further comprises a count value detection means for detecting the upper limit level and the lower limit level of the count value outputted from the counter circuit and for switching the first and second switches simultaneously, in response to the detected levels.

Therefore, a primary object of the present invention is to provide a control apparatus having a simple structure which is capable of reliable tracking control during accessing to a target track.

Another object of the present invention is to provide a control apparatus which is capable of detecting relative moving velocity of the optical head to the optical disk to be utilized in tracking control.

A primary advantage of the present invention is that stable velocity control of the optical head to the optical disk is possible even if track vibration, vibration of tracking actuator, or an unexpected disturbance velocity occurs during track accessing, without requiring an acceleration detection circuit, a waveform memory apparatus, or the like.

Another advantage of the present invention is that even in the case of a multi-pit type optical disk, the velocity of the optical head can be detected correctly, enabling smooth control of the linear actuator.

Yet another object of the present invention is that accuracy of the velocity detection of the optical head can be improved even if the moving velocity of the optical head becomes slow.

These and other objects, features and advantages of the present invention will be apparent from the following description of the preferred embodiments taken with the appended drawings.

DESCRIPTION OF THE PREFERRED EMBODIMENTS

Figure 7:
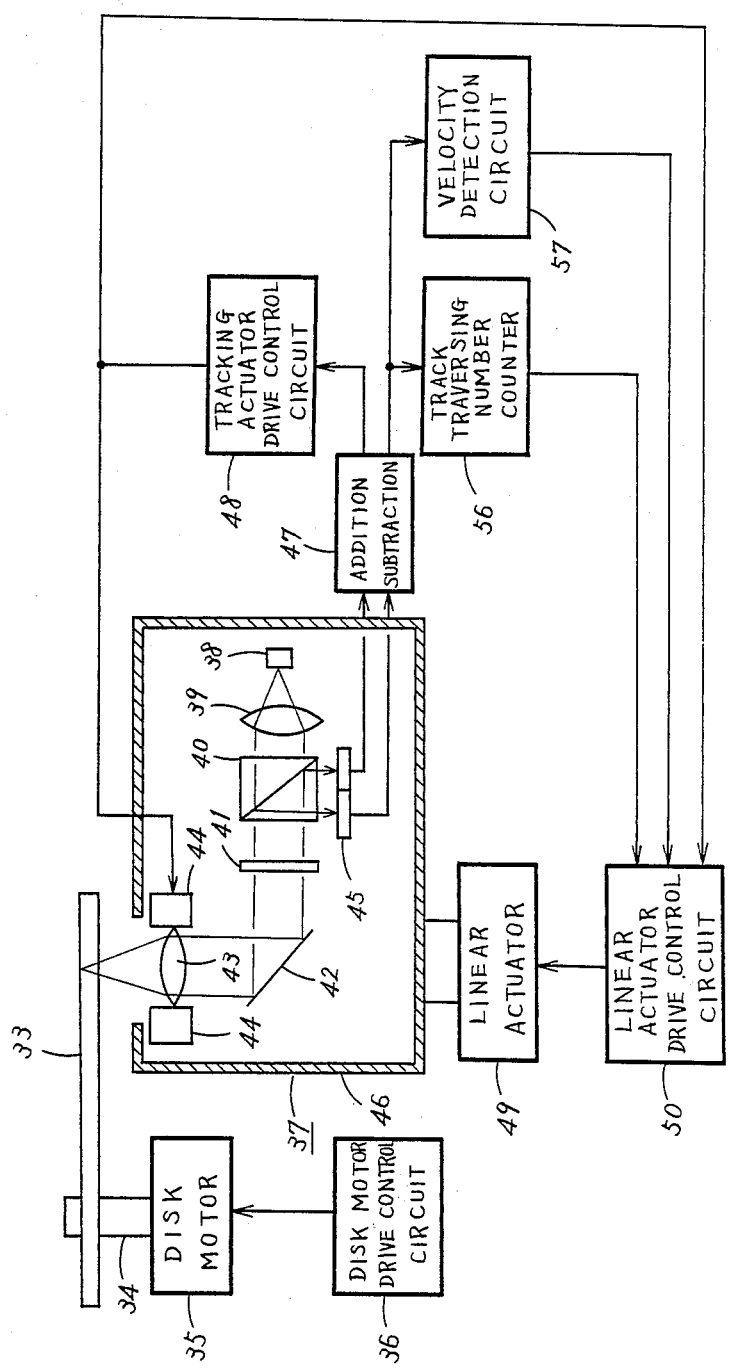
FIG. 7 is a schematic diagram of an optical head control system according to one example of the present invention.

FIG. 7 is a block diagram showing an optical head control system of an optical disk apparatus according to one embodiment of the present invention.

Figure 6:
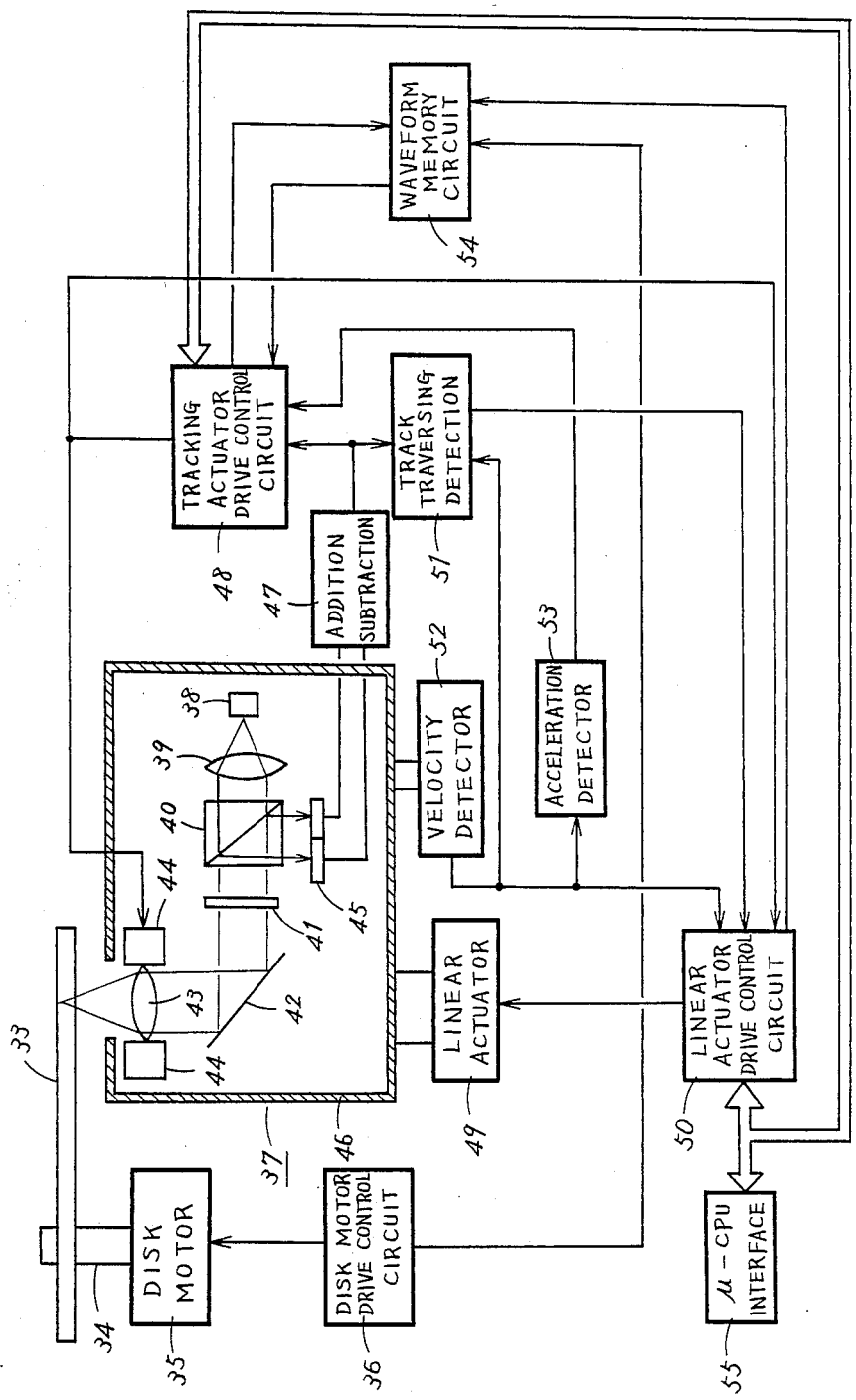
FIG. 6 is a schematic diagram showing one example of a optical head control system in an conventional optical disk apparatus.

The control system shown in FIG. 7 is identical with the control system shown in FIG. 6 except the following points. Namely, instead of the track traversing detecting circuit 51, the velocity detector 52, the acceleration detection circuit 53, the waveform memory circuit 54 and the micro-CPU interface 55 of the system of FIG. 6, the control system of FIG. 7 is provided with a track traversing number counter 56 which counts the number of tracks which the optical head 37 traversed upon receipt of a sum signal (RF signal) of the addition-subtraction amplifying circuit 47, and a velocity detection circuit 57 which detects relative velocity of the light spot of the optical head 37 to the optical disk 33 upon receipt of the RF signal output of the addition-subtraction amplifying circuit 47. Meanwhile, the difference output of the addition-subtraction amplifying circuit 47, i.e. the tracking error signal, is applied to the tracking actuator drive control circuit 48. Each of the outputs of the track traversing number counter 56 and the velocity detection circuit 57 is applied to the linear actuator drive control circuit 50.

Figure 8:
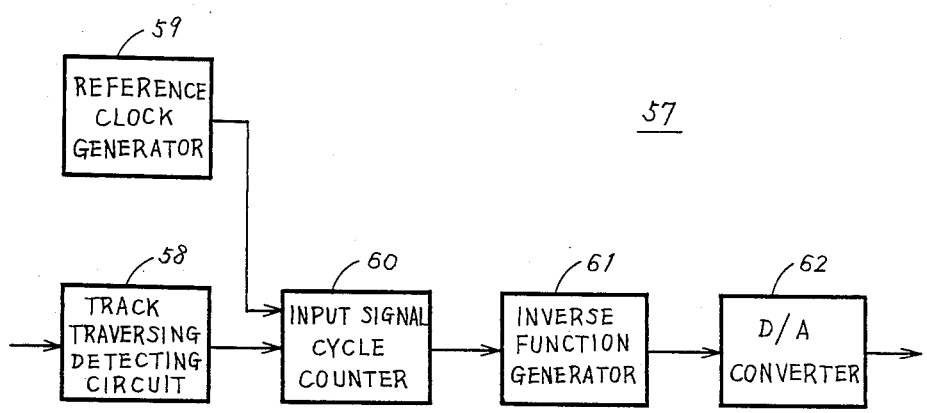
FIG. 8 is a block diagram showing a velocity detection circuit included in the control system of FIG. 7.

FIG. 8 is a block diagram of the velocity detection circuit 57 of FIG. 7. The structure of the velocity detection circuit shown in FIG. 8 will now be described.

Referring to FIG. 8, the track traversing detecting circuit 58 receives the RF signal from the addition-subtraction amplifying circuit 47, generates a pulse with a frequency responsive to the moving velocity of the optical head 37 at the time of traversing tracks, and applies it to an input signal cycle counter 60. The reference clock generator 59 generates a reference clock and applies it to the input signal cycle counter 60. Upon receiving these inputs, the input signal cycle counter 60 counts the number of the inputted reference clocks every time the optical head 37 moves one track pitch. The count value is applied to an inverse function generator 61; the inverse function generator 61 outputs a digital value, which is in the inverse relation to the given count value, and applies it to a digital/analog converter 62. The digital/analog converter 62 converts the digital signal into an analog signal to be outputted.

Figure 9:
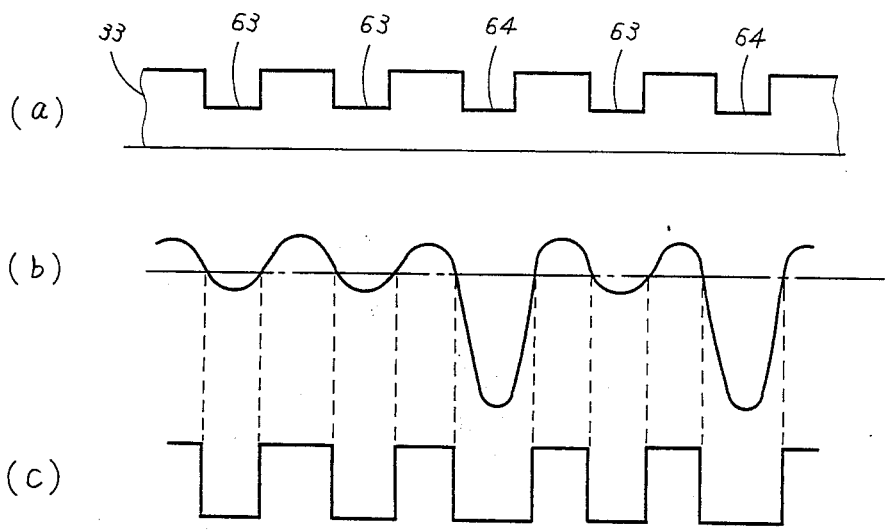
FIG. 9 shows a cross section of an optical disk and waveforms of an RF signal output of an addition-subtraction amplifying circuit and of an output of a track traversing detecting circuit at the time when a light spot is formed on the optical disk.

FIG. 9 shows a cross section (a) of an optical disk 33, a waveform (b) of the RF signal output of the addition subtraction amplifying circuit 47 and a waveform (c) of the output of the track traversing detecting circuit 58 at the time when a light spot is formed on the optical disk 33. A number of not-recorded track grooves 63 and recorded track grooves 64 are formed on the optical disk 33.

Figure 10:
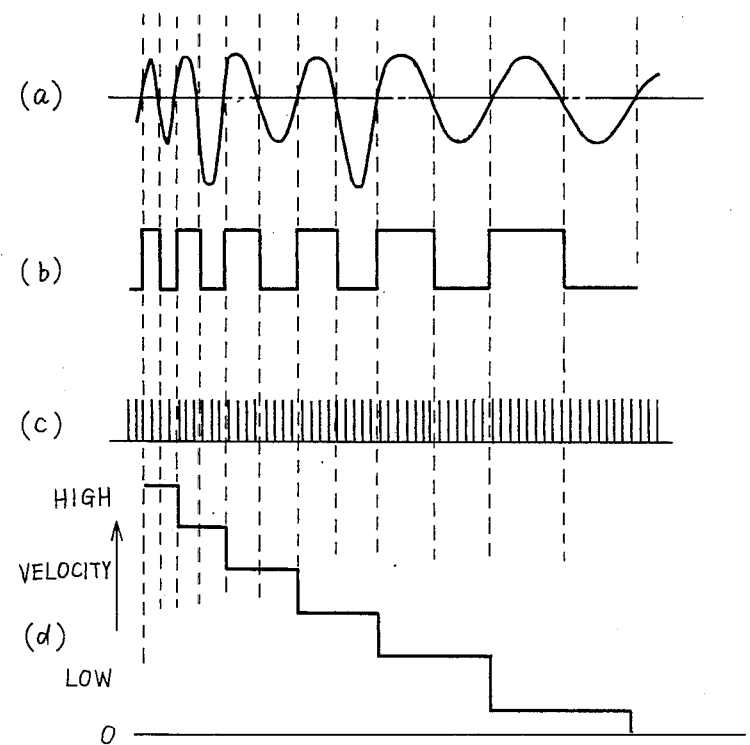
FIG. 10 is a diagram of waveforms showing outputs of each part of the velocity detection circuit during track accessing.

FIG. 10 shows waveforms of outputs from each of the parts of the velocity detection circuit 57 at the time when the light spot approaches the target track during track accessing. Meanwhile, the track traversing number counter 56 of FIG. 7 is composed of a circuit (not shown) having the same structure of the track traversing detecting circuit 58 and a counter (not shown) for counting the output pulse thereof.

The operation of the optical head control system according to one embodiment of the present invention will be hereinafter described with reference to FIGS. 7 to 10.

Light from a light source 38 is made parallel by a collimator lens 39 and passes through a polarizing beam splitter 40 to be linearlly polarized. Then the light passes through a λ/4 plate 41, the optical path thereof being changed by a mirror 42. Then it is focused on the normally rotating optical disk 33 by an object lens 43 forming a light spot. The light reflected from the optical disk 33 returns to the polarizing beam splitter 40 through the object lens 43, and then reflected by the polarizing beam splitter 40 to enter a split photo detector 45. The light entered into the split photo detector 45 undergoes photoelectric conversion by the split photo detector 45. Each of the photoelectrically converted signals is added to be a sum signal or subtracted to be a tracking error signal by means of the addition-subtraction amplifying circuit 47. The sum signal becomes an input to the track traversing number counter 56 and the velocity detection circuit 57, while the tracking error signal becomes an input to the tracking actuator drive control circuit 48. In track access control, the linear actuator drive control circuit 50 drives the linear actuator 49 for moving the optical head 37 in a radial direction of the optical disk 33.

Now, the optical disk 33 has tracks 63 and 64 as shown in FIG. 9(a) previously engraved thereon. In the case where recording is performed according to such multi-pit system, when a light spot traverses the tracks, the sum (RF) signal of the output from the split photo detector 45 represents a waveform shown in FIG. 9(b) due to the change in the amount of the light reflected from the optical disk 33. Namely, when a light spot passes a record pit on the recorded track groove 64, the amount of the reflected light decreases significantly whereby the level of the sum signal becomes low. Now, when the sum signal shown in FIG. 9(b) is compared in the track traversing detecting circuit 58 having a threshold of the level shown by a dash-and-dot line in FIG. 9(b), a track traversing signal such as shown in FIG. 9(c) can be obtained. During track access control, the optical head 37 is decelerating immediately before reaching the target track. Accordingly, the sum signal of the addition-subtraction amplifying circuit 47 becomes as shown in FIG. 10(a). The output of the track traversing detecting circuit 58 becomes as shown in FIG. 10(b).

From a reference clock generator 59, a reference clock such as shown in FIG. 10(c) having a frequency which is stable and higher than that of the track traversing signal is always generated. An input signal cycle counter 60 counts the number of the reference clocks from the reference clock generator 59 inputted during one cycle of the track traversing signal shown in FIG. 10(b) (the input signal cycle counter 60 may count the number of reference clocks every time the track traversing signal attained the "H" level and the "L" level). The count value is in proportion to the cycle duration of the track traversing signal, namely, it is inversely proportional to the track traversing velocity of the light spot. Therefore, by inputting the output of the input signal cycle counter 60 at every rise (or at every rise and fall) of the track traversing signal to an inverse function generator 61 and converting it into a signal which has an value inversely proportional to the counted number of the counter 60, the information of the velocity of the light spot, i.e. the optical head can be obtained. By converting this information into an analog signal by a digital/analog converter 62, a velocity detection signal of FIG. 10(d) can be obtained. The velocity detection signal is generated at every one cycle (or every half cycle) of the track traversing signal, as can be seen from FIG. 10(d). In addition, as can be seen from the comparison of FIGS. 10(b) and (d), the shorter the cycle of the track traversing signal (b) becomes, the higher the level of the velocity detection signal (d) becomes, namely, the faster the velocity of the light spot i.e. the optical head becomes.

Again, referring to FIG. 7, in track accessing, the linear actuator drive control circuit 50 drives the linear actuator 49, i.e. the optical head 37 on the basis of a velocity detection signal and a count value indicating the position of the light spot on the optical disk 33 detected by the velocity detection circuit 57 and the track traversing number counter 56, respectively, whereby the relative moving velocity of the light spot on the optical disk 33 to the optical disk 33 is controlled. Then, immediately after the light spot reaches the target track, the tracking actuator drive control circuit 48 is activated to drive the tracking actuator 44 on the basis of a tracking error signal outputted from the addition-subtraction amplifying circuit 47 and to apply a tracking control signal to the linear actuator drive control circuit 50 simultaneously. Correspondingly, the linear actuator 49 is also driven to be in the tracking mode, in which the light spot follows the center of the tracks on the optical disk 33. In this tracking mode, the linear actuator drive control circuit 50 does not refer to the information of position and velocity which is applied from the track traversing number counter 56 and the velocity detection circuit 57.

As described above, in the optical disk apparatus according to the present invention, the velocity detection circuit 57 detects the relative velocity of the light spot to the tracks of the optical disk 33, so that even if vibration of the tracking actuator or track vibration due to the eccentricity of the optical disk 33 occurs during accessing, the linear actuator 49 is driven to compensate for these movements, thereby controlling the relative velocity of the light spot to the track on the optical disk 33. Accordingly, the acceleration detection circuit 53 for preventing vibration of the tracking actuator 44, the waveform memory apparatus 54 for correcting the eccentric component of the optical disk 33, and the micro-CPU interface 55 shown in FIG. 6 become unnecessary, enabling simplification of the structure of the control system and lowering the cost thereof. In addition, according to this invention, non-cyclic velocity of the track vibration or disturbance velocity applied unexpectedly to the optical disk 33 can also be detected and depressed by the control system of the present invention, whereby a stable track access operation can be carried out.

Figure 11:
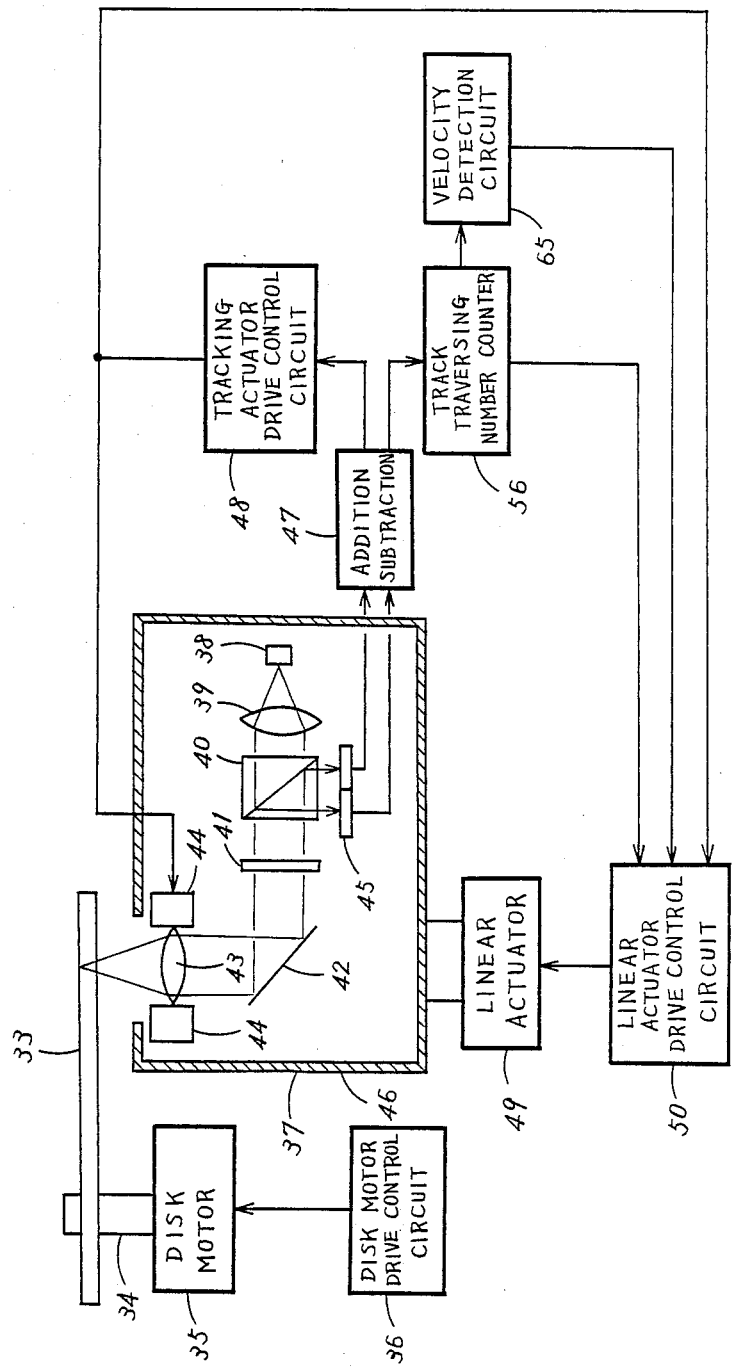
FIG. 11 is a schematic diagram of one modification of the embodiment shown in FIG. 7.

FIG. 11 is one modification of the control system of FIG. 7 according to one embodiment of the present invention. In the control system of FIG. 7, a circuit having the same structure as the track traversing detecting circuit 58 is used in the track traversing number counter 56: the control system of FIG. 11 is adapted to have one track traversing detecting circuit shared by the track traversing number counter and the velocity detection circuit. Therefore, the velocity detection circuit 65 of FIG. 11 is composed of the components of FIG. 8 except the track traversing detecting circuit 58, i.e. the reference clock generator 59, the input signal cycle counter 60, the inverse function generator 61 and the digital/analog converter 62. Therefore, the input of the velocity detection circuit 65 is connected to the output of the track traversing detecting circuit (which corresponds to the circuit 58 in FIG. 8) of the track traversing number counter 56.

In this embodiment, the inverse function generator 61 is provided in the stage preceding the digital/analog converter as in FIG. 8 but, alternatively an analog inverse function generator may be provided in the stage succeeding the digital/analog converter. In this case, the system may be adapted to convert a digital signal outputted from the input signal cycle counter 60 into an analog signal by the digital/analog converter and to output another analog signal having the inverse value of the analog signal from the analog inverse function generator.

Figure 12:
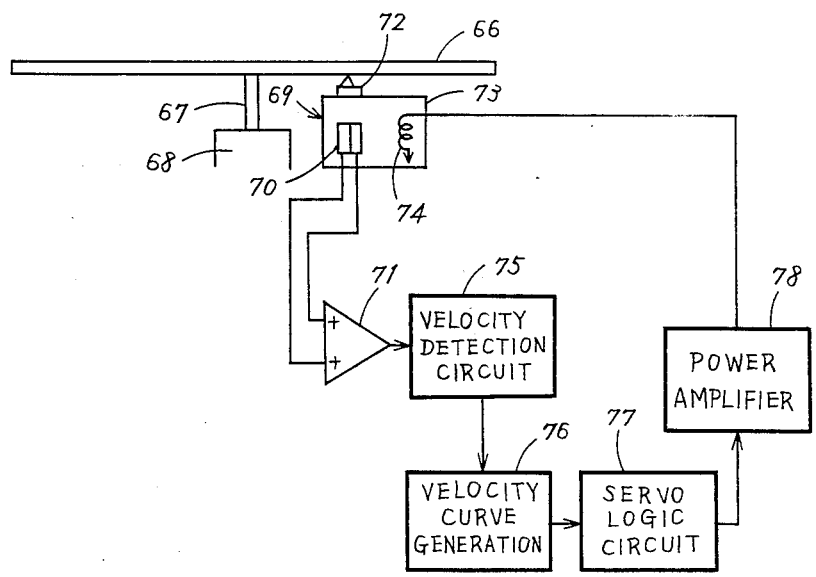
FIG. 12 is a schematic block diagram showing an optical head control system according to another embodiment of the present invention.

FIG. 12 is a schematic block diagram of an optical head control system according to another embodiment of the present invention. The structure of the control system shown in FIG. 12 will be hereinafter described. In FIG. 12, an optical disk 66 which is attached to a spindle 67 is revolved at high speed by a disk motor 68. Light from a light source (not shown) in a well known optical head 69 irradiates the optical disk 66 through an object lens (not shown) to form a light spot. The light reflected from the optical disk 66 is received at a photo detector 70 in the optical head 69; the output of the photo detector 70 is applied to the input of a summing amplifier 71. A tracking actuator 72 performs tracking by driving the object lens (not shown) so as to position the light spot at the center of a track on the optical disk 66, a linear actuator 73 controls a current flowing through a coil 74 and moves the optical head 69 in the radial direction of the optical disk 66. A velocity detection circuit 75 receives an RF signal which is the output of the addition amplifier 71 to detect the velocity of the optical head 69, namely, the light spot, moving in the radial direction of the optical disk 66. The output of the velocity detection circuit 75 is applied to a velocity curve generation circuit 76, which, responsive to this output, generates a target velocity voltage. According to the target velocity voltage, a servo logic circuit 77 and a power amplifier 78 are driven, and the current flowing through the coil 74 of the linear actuator 73 is controlled.

Figure 13:
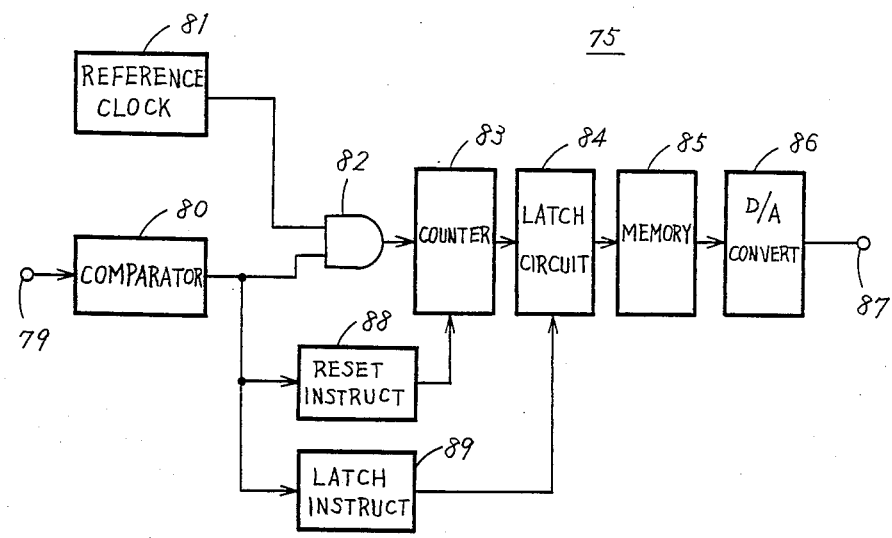
FIG. 13 is a block diagram showing a velocity detection circuit included in the control system of FIG. 12.

FIG. 13 is a block diagram of the velocity detection circuit 75 of the control system of FIG. 12. In FIG. 13, an RF signal from the summing amplifier 71 (FIG. 12) is applied to the input of a comparator 80 through a terminal 79. The comparator 80 compares the inputted RF signal with the reference level $V_{ref}$ to output a gate signal for forming a digital signal which is applied to one input of an AND gate 82. A pulse sequence having a higher frequency than the RF signal is applied to the other input of the AND gate 82 from a reference clock pulse generation circuit 81. The AND gate 82 outputs a pulse sequence which is a logical product of the output of the comparator 80 and the output of the reference clock pulse generation circuit 81; a counter circuit 83 counts the pulse sequence outputted from the AND gate 82. The output of the counter circuit 83 is stored by a latch circuit 84. According to the data stored in the latch circuit 84, a memory circuit 85 outputs velocity data having inverse value of the latch stored data. A digital/analog converter 86 converts the output of the memory circuit 85 into an analog signal and outputs it from an output terminal 87. A reset instruction circuit 88 receives the output of the comparator 80 and generates a reset pulse for initializing the output of the counter circuit 83; a latch instruction circuit 89 receives the output of the comparator 80 and generates a pulse for storing the output of the counter circuit 83 in the latch circuit 84.

Figure 14:
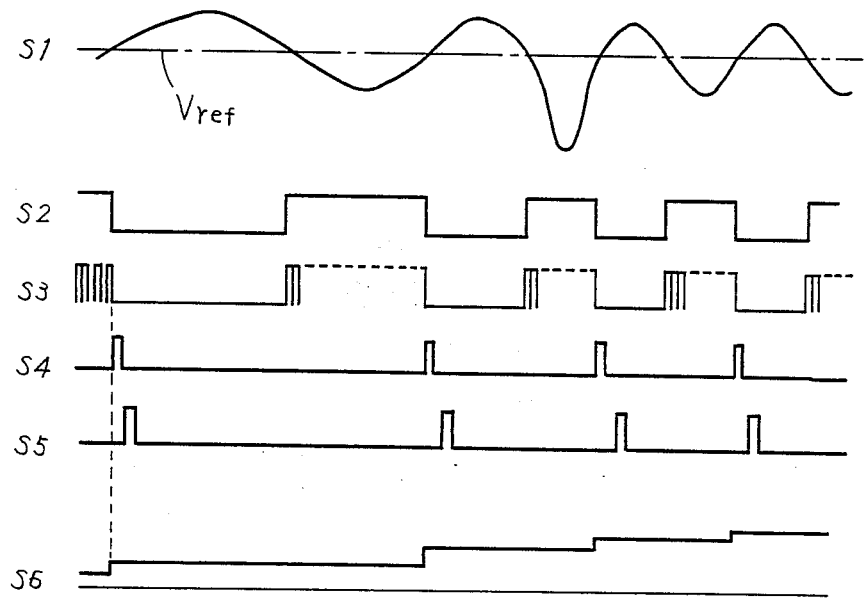
FIG. 14 is a diagram of waveforms showing outputs of each part of the velocity detection circuit shown in FIG. 13.

FIG. 14 is a diagram of waveforms for describing the operation of the circuit shown in FIGS. 12 and 13. The operation of the control system according to one embodiment of the present invention will be hereinafter described with reference to FIGS. 12 to 14.

In the optical disk apparatus of FIG. 12, during track accessing, track traversing light information of the optical disk 66 is read out and applied to a photo detector 70 through the object lens (not shown) retained by the tracking actuator 72, and the like. By adding the outputs of the photo detector 70 by means of the summing amplifier 71, a sum signal of the outputs of the photo detector 70, i.e. an RF signal S1 (FIG. 14) can be obtained. By inputting this RF signal S1 into the velocity detection circuit 75, a velocity detection signal S6 (FIG. 14) can be obtained. By inputting the velocity detection signal S6 into the velocity curve generation circuit 76 and by controlling the current flowing through the coil 74 of the linear actuator 73 through the servo logic circuit 77 and the power amplifier 78, the moving velocity of the optical head 69, i.e. the light spot, is controlled by the linear actuator 73.

In the velocity detection circuit 75 shown in FIG. 13, an RF signal S1 is inputted to the comparator 80 through the terminal 79. By the comparison of the signal S1 with the reference value $V_{ref}$, a rectangular pulse signal S2 (FIG. 14) is outputted as an output of the comparator 80. By the operation of the output S2 of the comparator 80 and the reference clock pulse output, which has a frequency several times higher than the maximum frequency of the RF signal S1 and which is outputted from the reference clock pulse generation circuit 81 at an AND circuit 82, a signal S3 (FIG. 14), i.e., a pulse sequence composed of reference clock pulses which passed the circuit only when the signal S2 is at the "H" level, is obtained at the output of the AND circuit 82. Meanwhile, if the output of the comparator 80 is inputted in the reset instruction circuit 88, a pulse signal S5 (FIG. 14) for resetting the counter 83 is generated before the beginning of counting of the counter 83. If the output of the comparator 80 is inputted in the latch instruction circuit 89, a pulse signal S4 (FIG. 14) for storing the output of the counter circuit 83 in the latch circuit 84 is generated after the completion of counting of the counter circuit 83. First, the counter circuit 83 is reset by the output pulse signal S5 of the counter reset instruction circuit 88; then the pulse sequence which comes out as the output signal S3 of the AND gate is counted by the counter circuit 83. After the completion of counting by the counter circuit 83, the result of the counting of the counter circuit 83 is stored in the latch circuit 84 by the output pulse signal S4 of the latch instruction circuit 89. Since the memory circuit 85 stores the velocity data which is inversely proportional to the period of the RF signal S1 (namely, proportional to the frequency of the RF signal S1), when the output of the latch circuit 84 is applied to the memory circuit 85, velocity data which corresponds to the applied data is outputted from the memory circuit 85. The output from the memory circuit 85 is inputted to the digital/analog converter 86 to be converted into an analog signal, and an analog velocity detection signal S6 for controlling the linear actuator is outputted from the output terminal 87.

Figure 1:
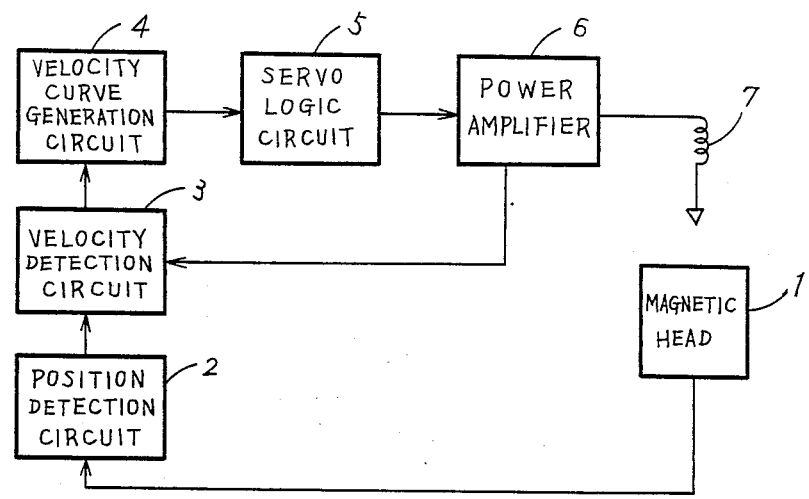
FIG. 1 is a schematic block diagram showing a magnetic head control system of a conventional magnetic disk storage.
Figure 2:
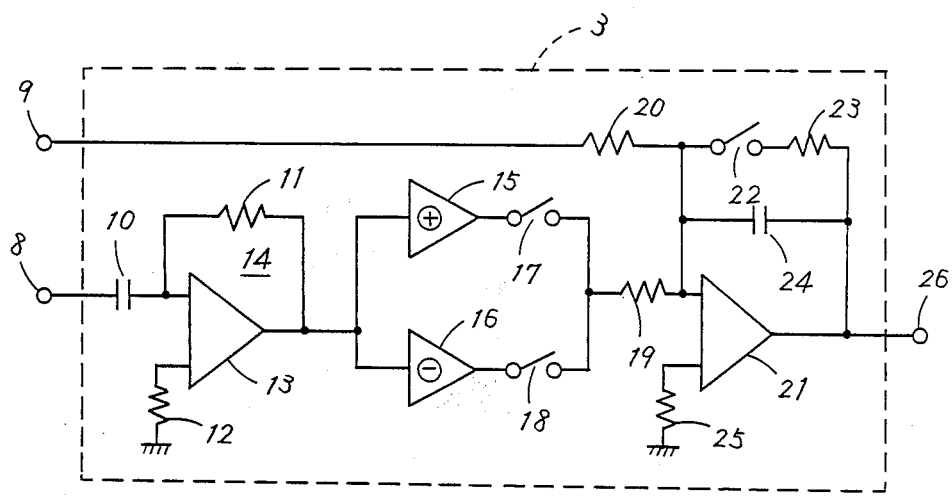
FIG. 2 is a schematic diagram of a velocity detection circuit included in the control system of FIG. 1.
Figure 3:
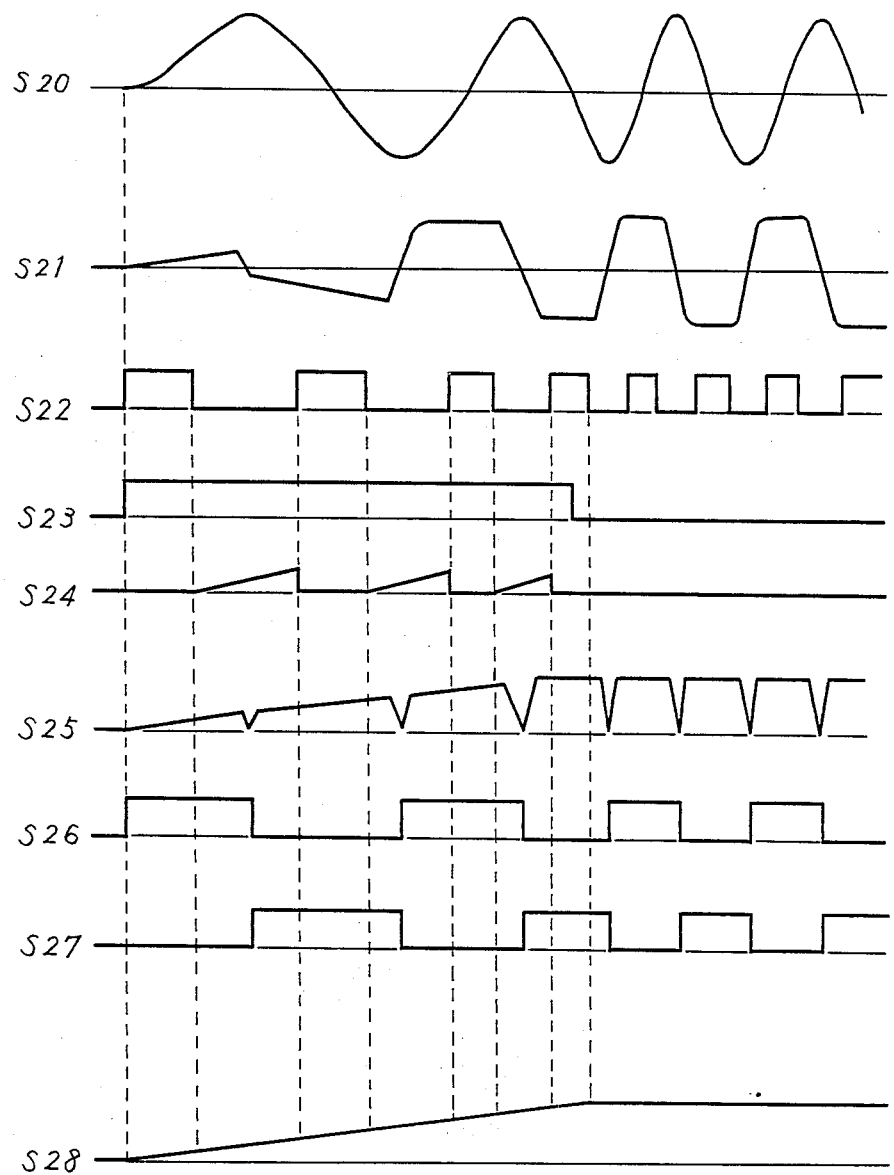
FIG. 3 is a diagram of waveforms showing the operation of the velocity detection circuit shown in FIG. 2.
Figure 4:
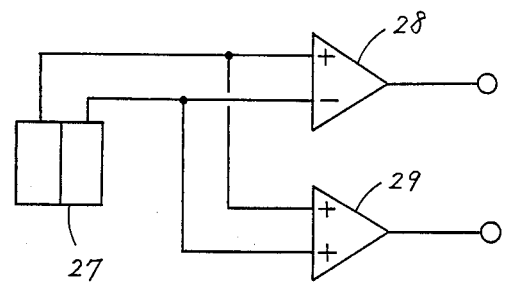
FIG. 4 is a schematic diagram of a photo detector and the signal circuit thereof included in an optical head of an optical disk apparatus.
Figure 5A:
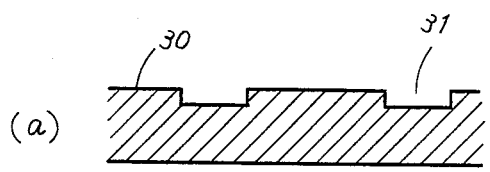
FIGS. 5A and 5B show cross sections of an optical disk, and the waveforms of a tracking error signal and an RF signal in case a light spot is formed on the cross section, respectively.
Figure 5A:
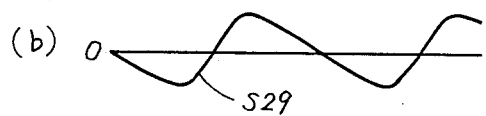
Figure 5A:
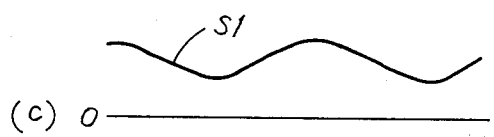
Figure 5B:
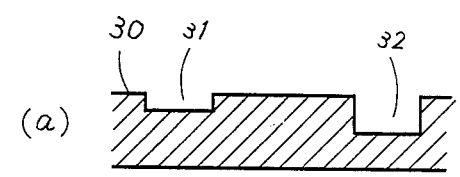
Figure 5B:
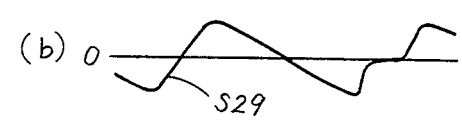
Figure 5B:
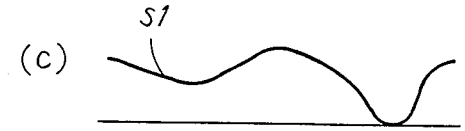

According to the above described circuit, although the sum signal, i.e. the RF signal S1 of the photo detector 70 decreases at the recorded data portion as shown in FIG. 5B in the case of a multi-pit type optical disk, the cycle width of the RF signal S1 can be detected at a portion where the value of the sum signal S1 of the photo detector 70 changes, by properly setting the reference value $V_{ref}$ of the comparator 80, whereby a stable velocity detection signal S6 for controlling the linear actuator can be outputted as described above.

Figure 15:
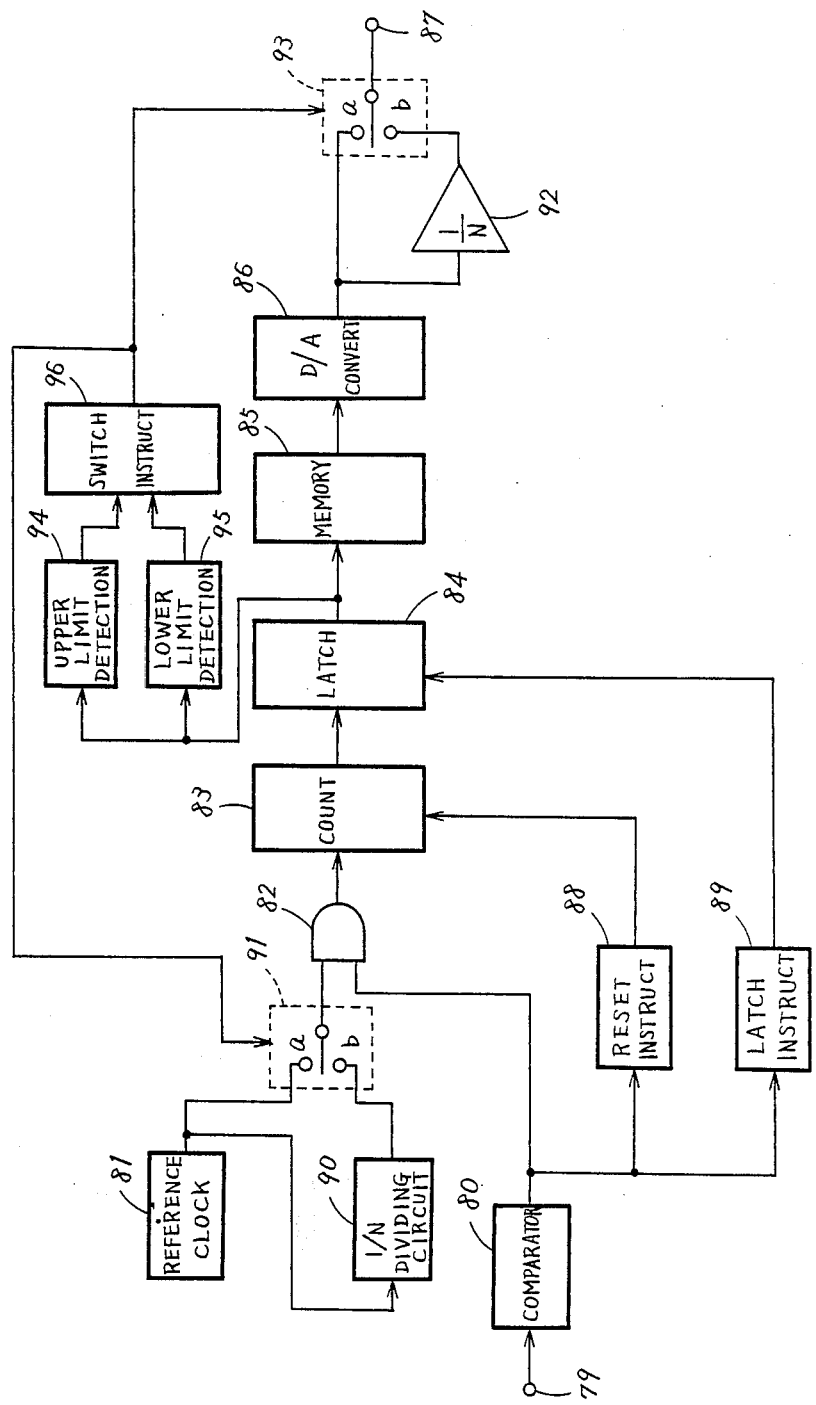
FIG. 15 is a schematic diagram showing one modification of the velocity detection circuit shown in FIG. 13.

FIG. 15 is a block diagram showing a modification of the velocity detection circuit shown in FIG. 13. The circuit of FIG. 15 is identical with the circuit of FIG. 13 except the following points. The first point is provision of a 1/N dividing circuit 90 for dividing the output frequency of the reference clock pulse generation circuit 81 by N (N is a positive integer larger than 1). Either the output of the reference clock pulse generation circuit 81 or the output of the 1/N dividing circuit 90 is selected by a switch 91 to be applied to one input of the AND gate 82. The second point is provision of an amplifier 92 for amplifying the output of the digital/analog converter 86 by 1/N to be outputted. Either the output of the digital/analog converter 86 or the output of the amplifier 92 is selected by a switch 93 to be outputted from the terminal 87. The third point is provision of an upper limit detection circuit 94 which, in response to the output of the latch circuit 84, detects the count value of the counter circuit 83 reaching the upper limit, and a lower limit detection circuit 95 which, also in response to the output of the latch circuit 84, detects the count value of the counter circuit 83 reaching the lower limit. A switching instruction circuit 96 outputs a signal for switching the switches 91 and 93 simultaneously, in response to the outputs of the upper limit detection circuit 94 and the lower limit detection circuit 95.

Figure 16:
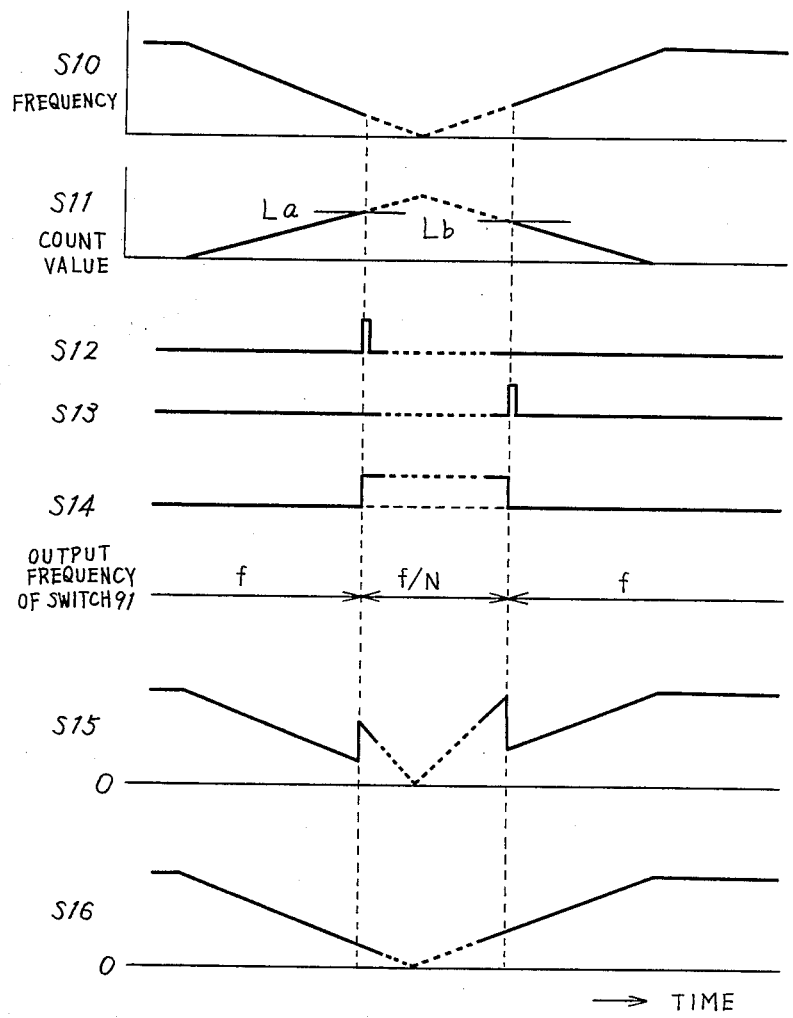
FIG. 16 is a diagram of waveforms for describing the operation of the velocity detection circuit shown in FIG. 15.

FIG. 16 is a diagram of waveforms for describing the operation of the circuit shown in FIG. 15. The operation of the circuit shown in FIG. 15 will now be described with reference to FIG. 16.

An RF signal obtained by the addition amplifier 71 during track accessing is applied to the terminal 79, the frequency of the alternating current component of the RF signal including a signal which is in proportion to the velocity of the linear actuator, i.e. the light spot of the optical head 69. Now, let us consider a case where the frequency S10 of the alternating current component of the RF signal changes as shown in FIG. 16. Let us assume that the velocity of the linear actuator, i.e., the light spot of the optical head is high and the switching instruction signal S14 outputted from the switching instruction circuit 96 is at the "L" level so that the terminal a is selected at each of the switches 91 and 93. In this case, the circuit shown in FIG. 15 has the same structure as that of the circuit shown in FIG. 13. Accordingly, the output of the reference clock pulse generation circuit 81 is inputted to the AND circuit 82 as it is, while the output signal S16 of the digital/analog converter 86 is outputted at the output terminal 87 as the velocity detection signal which is in proportion to the frequency S10 of the RF signal. If the velocity of the linear actuator, i.e., the light spot of the optical head decreases gradually, the velocity signal to be outputted at the output terminal 87 gradually becomes smaller, but, on the contrary, the width of the cycle of the output from the comparator 80 gradually becomes wider and the output of the counter circuit 83, namely the count value S11 of the counter circuit 83, also increases. If the count value S11 of the counter circuit 83 passes over the upper limit (La level), the output signal S12 of the upper limit detection circuit 94 becomes the "H" level and, according to this signal, the output signal S14 of the switching instruction circuit 96 becomes "H" level. Accordingly, as the output signal S14 of the switching instruction circuit 96 reached the "H" level, each of the switches 91 and 93 is switched to the terminal b, whereby the output of the 1/N divider 90, namely, a signal obtained by dividing the reference clock pulse by N (a pulse signal having a frequency of f/N assuming that the frequency of the reference clock pulse is f) is inputted to the AND circuit 82. Therefore, the count value which is the output of the counter circuit 83, becomes 1/N compared with the case where the reference clock pulse is selected as the clock. This value is inputted to the latch circuit 84, and the value N times as much as the actual velocity data is outputted from the memory circuit 85. On this occasion, since the output signal S14 of the switching instruction circuit 96 is at the "H" level, the switch 93 is switched to the terminal b, and the output signal S15 of the digital/analog converter 86 has its gain reduced to 1/N by the amplifier 92, whereby a velocity detection signal S16, which succeeds the data before switching, is obtained. Meanwhile, if the velocity of the linear actuator, i.e., the light spot of the optical head increases gradually, the frequency S10 of the alternating current component of the RF signal gradually becomes higher. Accordingly, the width of the cycle of the output signal from the comparator 80 gradually becomes narrower and the output of the counter circuit 83, i.e., the count value also decreases. When the output of the counter circuit 83, namely, the count value, becomes smaller than the lower limit (Lb level), the output signal S13 of the lower limit level detection circuit 95 becomes the "H" level, whereby the output signal S14 of the switch instruction circuit 96 becomes the "L" level. Since the output signal S14 of the switch instruction circuit 96 reaches the "L" level, each of the switches 91 and 93 is connected to the terminal a, whereby the output of the reference clock pulse generation circuit 81 is inputted to the AND circuit 82 as it is and the output signal S15 of the digital/analog converter 86 is outputted from the terminal 87 as it is.

Therefore, according to this embodiment of the present invention, accuracy of the velocity detection signal in the case where the velocity of the linear actuator 73 or the light spot of the optical head 69 is decreased can be improved, resulting in a highly improved control ability.

Although description was given for the one-beam type optical disk apparatus in each of the above described embodiments, the present invention can be applied to any type provided that the RF signal (sum signal) and tracking error signal are obtained by the apparatus of that type.

Although the present invention has been described with reference to specific embodiments, it should be understood that these embodiments are exemplary preferred embodiments and that modifications may be made without departing from the scope of invention as defined in the appended claims.

What is claimed is:

1. A control apparatus for controlling relative movement of an optical head to an optical disk, wherein said optical disk has a plurality of tracks in which information is stored and said optical head has light emitting means for emitting light on said optical disk and photo detecting means for receiving the reflected light from said optical disk and for generating a photoelectric conversion signal; said control apparatus comprising an actuator for moving said optical head in a radial direction of said optical disk;

a velcoity detecting means for detecting relative moving velocity of said optical head to said optical disk during access to a track of said optical disk, said velocity detecting means comprising:

first means for generating a first signal which has a first relation to a period of said photoelectric conversion signal generated by said photo detecting means; and second means responsive to said first signal for outputting a second signal which has a second relation, being an inverse of said first relation, to the period of said photoelectric conversion signal representing said relative moving velocity; and actuator control means for controlling said actuator in response to said second signal.

2. A control apparatus according to claim 1, wherein said first signal is a digital signal, said second signal is an analog signal, and said second means comprises an digital/analog converter.

3. A control apparatus according to claim 1, wherein said photo detecting means is composed of a split type photo detector and said photoelectric conversion signal is a function of each of the outputs of said split type photo detector.

4. A control apparatus according to claim 1, wherein said first means comprises a comparator for converting said photoelectric conversion signal into a rectangular pulse signal;

a reference clock pulse generation circuit for generating a reference clock pulse;

a gate circuit for receiving said rectangular pulse signal from said comparator and said reference clock pulse from said reference clock pulse generation circuit, said gate circuit being opened corresponding to said rectangular pulse signal to output said reference clock pulse; and a counter circuit for counting pulses outputted from said gate circuit and for outputting the count value as said first signal;

said second means comprises a memory circuit responsive to said count value counted by said counter circuit for generating a digital signal representing a value which is inversely related to said counted value; and a digital/analog converter for converting said digital signal outputted from said memory circuit into an analog signal and for outputting the analog signal as said second signal.

5. A control apparatus according to claim 4, wherein said first means further comprises:

a dividing circuit for dividing a frequency of the reference clock pulse outputted from said reference clock pulse generation circuit by N; and first switch for selectively outputting either the output pulse of said reference clock pulse generation circuit or the output pulse of said dividing circuit;

said gate circuit, being opened corresponding to said rectangular pulse signal from said comparator, outputs the pulse selected by said first switch;

said second means further comprises an amplifier for amplifying the output of said digital/analog converter by 1/N to be outputted; and a second switch for selectively outputting one of the output of said digital/analog converter and the output of said amplifier as said second signal; said control apparatus further including count value detecting means for detecting an upper limit level and a lower limit level of the count value outputted from said counter circuit and for correspondingly switching said first and second switches simultaneously.

6. A control apparatus according to claim 5, wherein:

said count value detecting means is operable, upon detecting that the counted value of said counter circuit has reached the upper limit, for switching said first switch to select the output pulse of said dividing circuit and for switching said second switch to select the output of said amplifer; and said count value detecting means being further operable, upon detecting that the count value of said counter circuit has reached the lower limit, for switching said first switch to select the output pulse of said reference clock pulse generation circuit and for switching said second switch to select the output pulse of said digital/analog converter.

7. In a velocity control system for controlling velocity of relative movement of an optical head to an optical disk, said control system provides a traverse signal having a frequency corresponding to said velocity of relative movement of the optical head to the optical disk and velocity detecting means, the improvement comprising:

means for providing increased accuracy upon detection of reduced relative velocity, including in said velocity detecting means:

counting means for counting during cycles of said traverse signal a reference clock signal having a frequency f, and memory means receiving as an input the count of said counting means, said memory means storing data inversely proportional to said input count and providing said stored data as a digital signal proportional to said velocity of relative movement, upper limit detecting means for determining when an upper limit is reached for the count of said counting means, said upper limit representing a low velocity limit, first means operable in response to detection of said upper limit by said upper limit detecting means for switching said reference clock pulse signal to have a reduced frequency f/N, thereby increasing the value of the inverse data output from said memory, and second means operable in response to detection of said upper limit by said upper limit detecting means to provide a multiplier means for mutliplying the output of said memory means by 1/N to provide said digital signal, thereby providing an N-fold increase in accuracy of the digital signal proportional to said velocity of relative movement for velocities below said low velocity limit.

8. In a velocity control system for controlling velocity of relative movement of an optical head to an optical disk, the improvement comprising:

means for providing increased accuracy upon detection of reduced relative velocity, including:

inverse function means for eliminating a low pass filter from a frequency to voltage converter, wherein said control system provides a traverse signal having a pulse width corresponding to radial travel time between tracks of the disk, and said inverse function means comprises velocity detecting means, said velocity detecting means including first limit detecting means for determining when a lower limit is reached for a shortened pulse width of said traverse signal occurring during times of fast velocity of movement and, in response thereto, obtaining counts of a reference clock pulse signal during said shortened pulse width, and access means for obtaining from a memory a value inversely proportional to the obtained counts during the pulse width and for outputting the obtained value as an output signal corresponding to said inverse value as a velocity signal;

said velocity detecting means including second limit detecting means for determining when an upper limit is reached for a lengthened pulse width of said traverse signal occurring during times of reduced velocity of movement and, in response thereto dividing the reference clock frequency by a value N, obtaining counts of the divided frequency reference clock pulse signal during the lengthened pulse width, said access means operable for obtaining from the memory a value inversely proportional to the reduced counts of said reduced clock frequency, for dividing the value obtained from the memory by N to increase accuracy by a factor of N during the lengthened pulse width, and for outputting the obtained value as an output signal corresponding to said reduced velocity signal.

9. In a velocity control system for controlling velocity of relative movement of an optical head to an optical disk, the improvement comprising:

means for providing increased accuracy upon detection of reduced relative velocity, including:

inverse function means for eliminating a low pass filter from a frequency to voltage converter, wherein said control system provides a traverse signal having a frequency corresponding to said velocity of relative movement of the optical head to the optical disk, and said inverse function means comprises velocity detecting means including: counting means for counting during cycles of said traverse signal a reference clock signal having a frequency f, and memory means receiving as an input the count of said counting means, said memory means storing data inversely proportional to said input count and providing said stored data as a digital signal proportional to said velocity of relative movement, said velocity detecting means further including:

upper limit detecting means for determining when an upper limit is reached for the count of said counting means, said upper limit representing a low velocity limit, first means operable in response to detection of said upper limit by said upper limit detecting means for switching said reference clock pulse signal to have a reduced frequency f/N, thereby increasing the value of the inverse data output from said memory, and second means operable in response to detection of said upper limit by said upper limit detecting means to provide a multiplier means for multiplying the output of said memory means by 1/N to provide said digital signal, thereby providing an N-fold increase in accuracy of the digital signal proportional to said velocity of relative movement for velocities below said low velocity limit.

10. An improved velocity control system as recited in claim 9, said velocity detecting means further including:

lower limit detecting means for determining when a lower limit is reached for the count of said count means, said lower limit representing a high velocity limit, said first means operable in response to detection of said lower limit by said lower limit detecting means for switching said reference clock pulse signal to have said frequency f, thereby decreasing the value of the data output from said memory for velocities above said high velocity limit, and said second means operable in response to detection of said lower limit by said lower limit detecting means for disconnecting said multiplier means from the output of said memory means thereby to provide said output directly as said digital signal.

11. An improved velocity control system as recited in claim 10, further comprising converting means for converting the inverse value obtained from the memory to anlog and outputting the converted value as an output analog signal corresponding to said velocity signal.

12. An improved velocity control system as recited in claim 9, further comprising converting means for converting the inverse value obtained from the memory to analog and outputting the converted value as an output analog signal corresponding to said velocity signal.

13. An improved velocity control system as recited in claim 9, wherein said velocity detecting means is operable for performing a velocity detection twice for each track of said disk.

14. An improved velocity control system as recited in claim 9, further comprising track counting means for counting a number of tracks traversed during travel to a designated track location, said track counting means comprising down counting counter means operable for performing a down counting operation irrespective of a direction of travel when traversing the tracks on the disk, and seprate direction means, responsive to a relative velocity detected by said velocity detecting means for actuating a drive control circuit in an appropriate direction.

* * * * *